Nov. 25, 1969  E. C. LUCKENBACH  3,480,406
REACTION VESSEL
Filed June 30, 1966  5 Sheets-Sheet 1

E. C. LUCKENBACH INVENTOR

BY

PATENT ATTORNEY

Nov. 25, 1969       E. C. LUCKENBACH       3,480,406
                    REACTION VESSEL
Filed June 30, 1966                    5 Sheets-Sheet 2

E. C. LUCKENBACH, INVENTOR

BY George J. Silbury

PATENT ATTORNEY

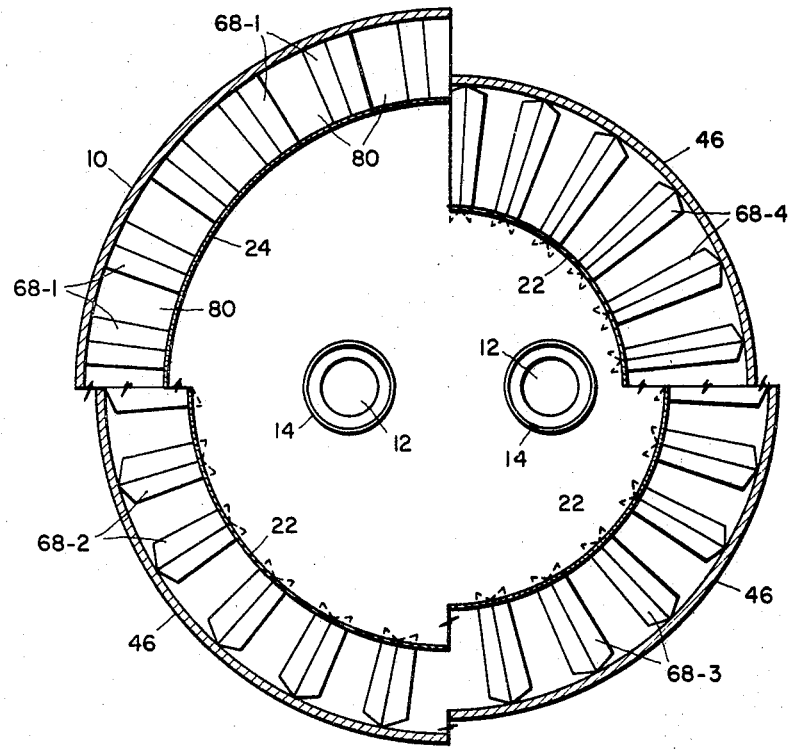
FIG. 7
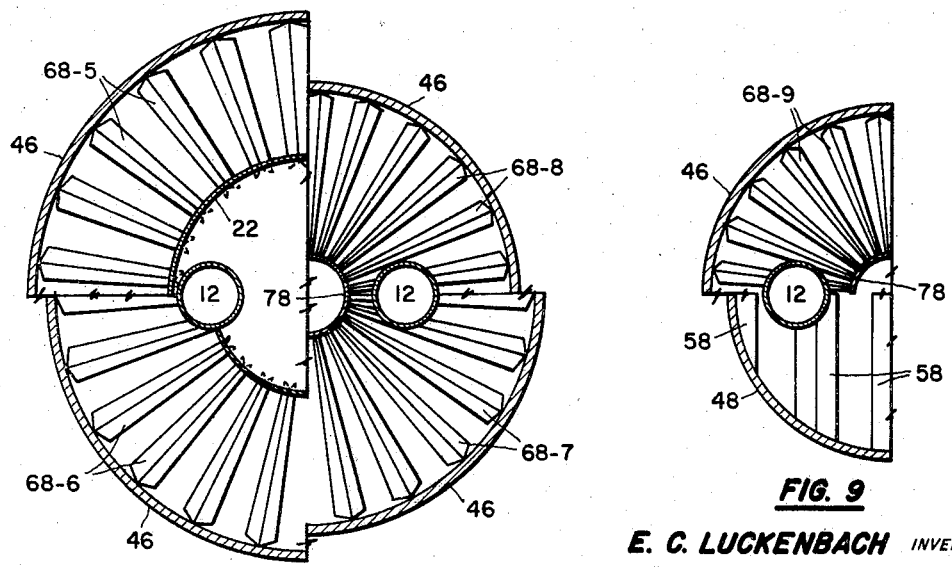
FIG. 8
FIG. 9
E. C. LUCKENBACH INVENTOR

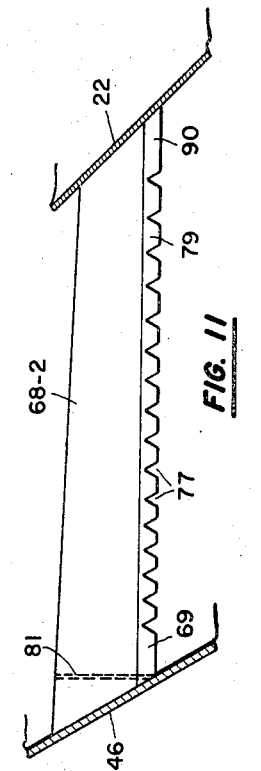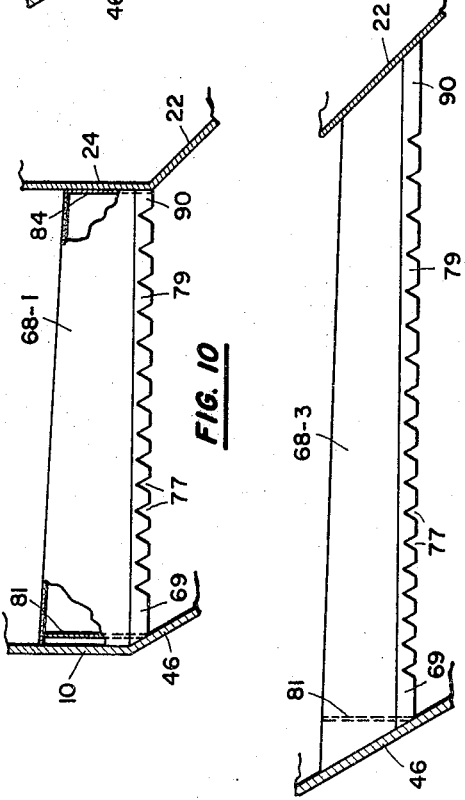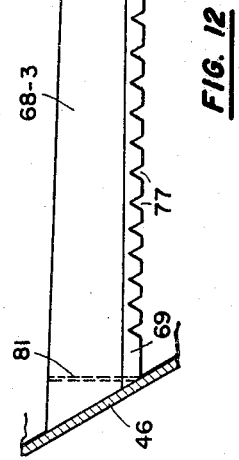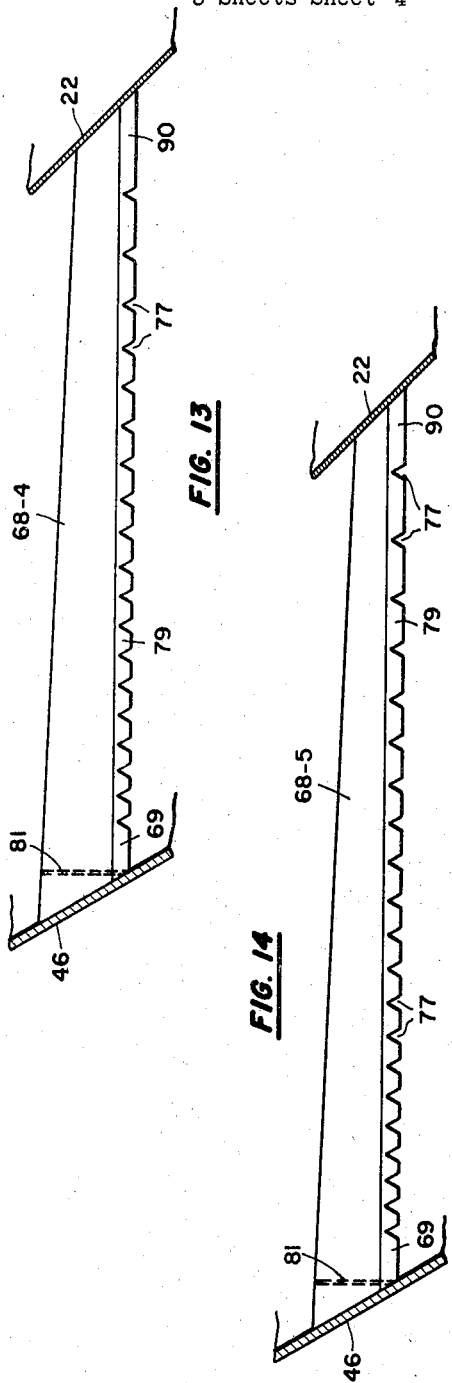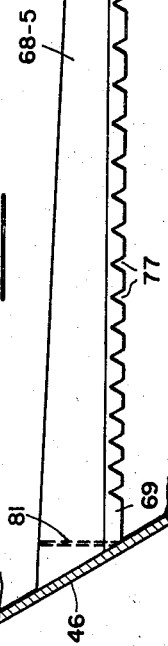
E. C. LUCKENBACH INVENTOR
PATENT ATTORNEY

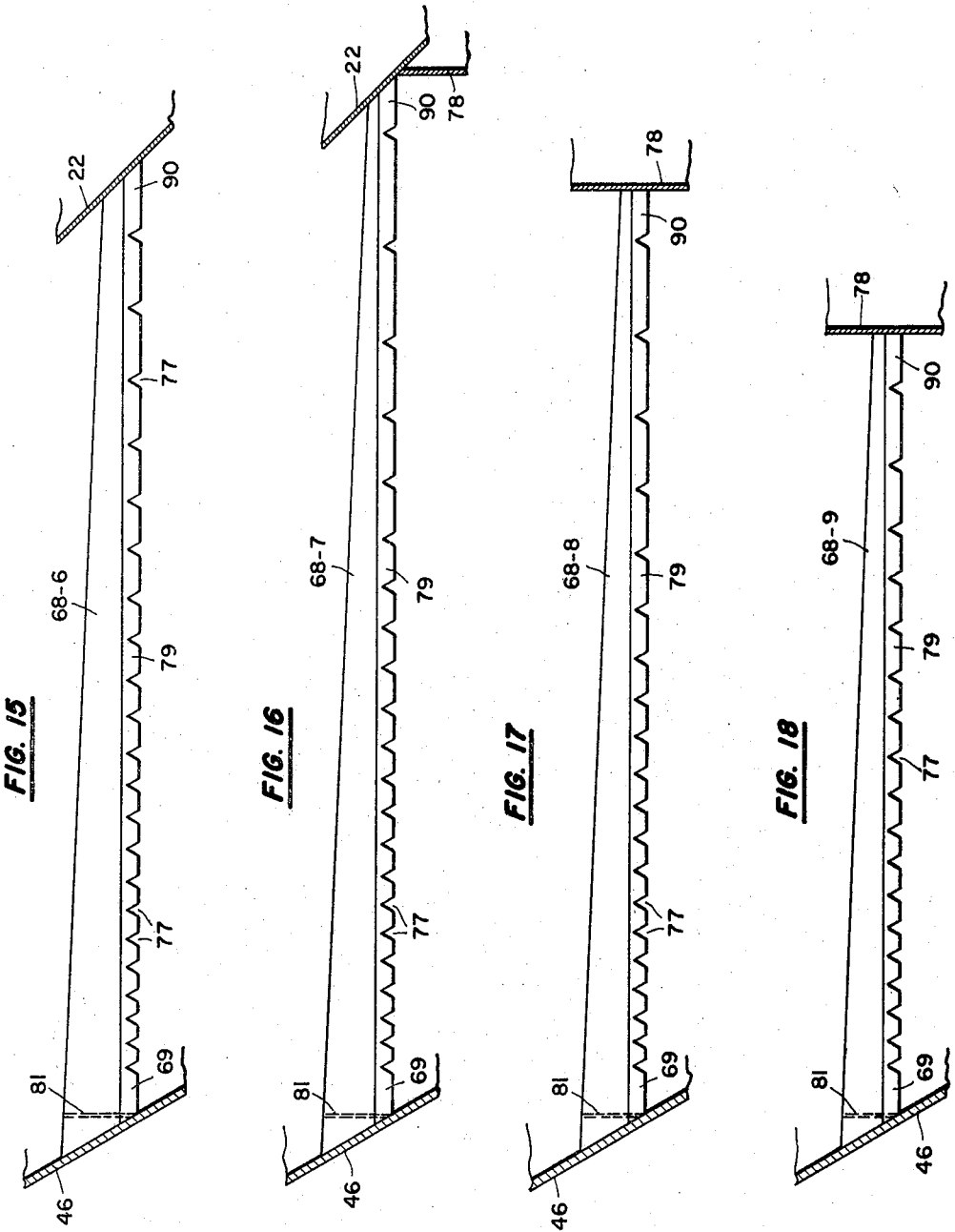

United States Patent Office 3,480,406
Patented Nov. 25, 1969

3,480,406
REACTION VESSEL
Edward C. Luckenbach, Mountainside, N.J., assignor to Esso Research and Engineering Company, a corporation of Delaware
Filed June 30, 1966, Ser. No. 566,700
Int. Cl. B01j 9/12, 11/02
U.S. Cl. 23—288                                       3 Claims

ABSTRACT OF THE DISCLOSURE

Fluidized bed catalytic reactor with provision for stripping in a tapered annular chamber, comprising sheds with sloping roofs and vertical sides having serrations spaced to provide uniform stripping gas flow.

---

Figures 1, 2:
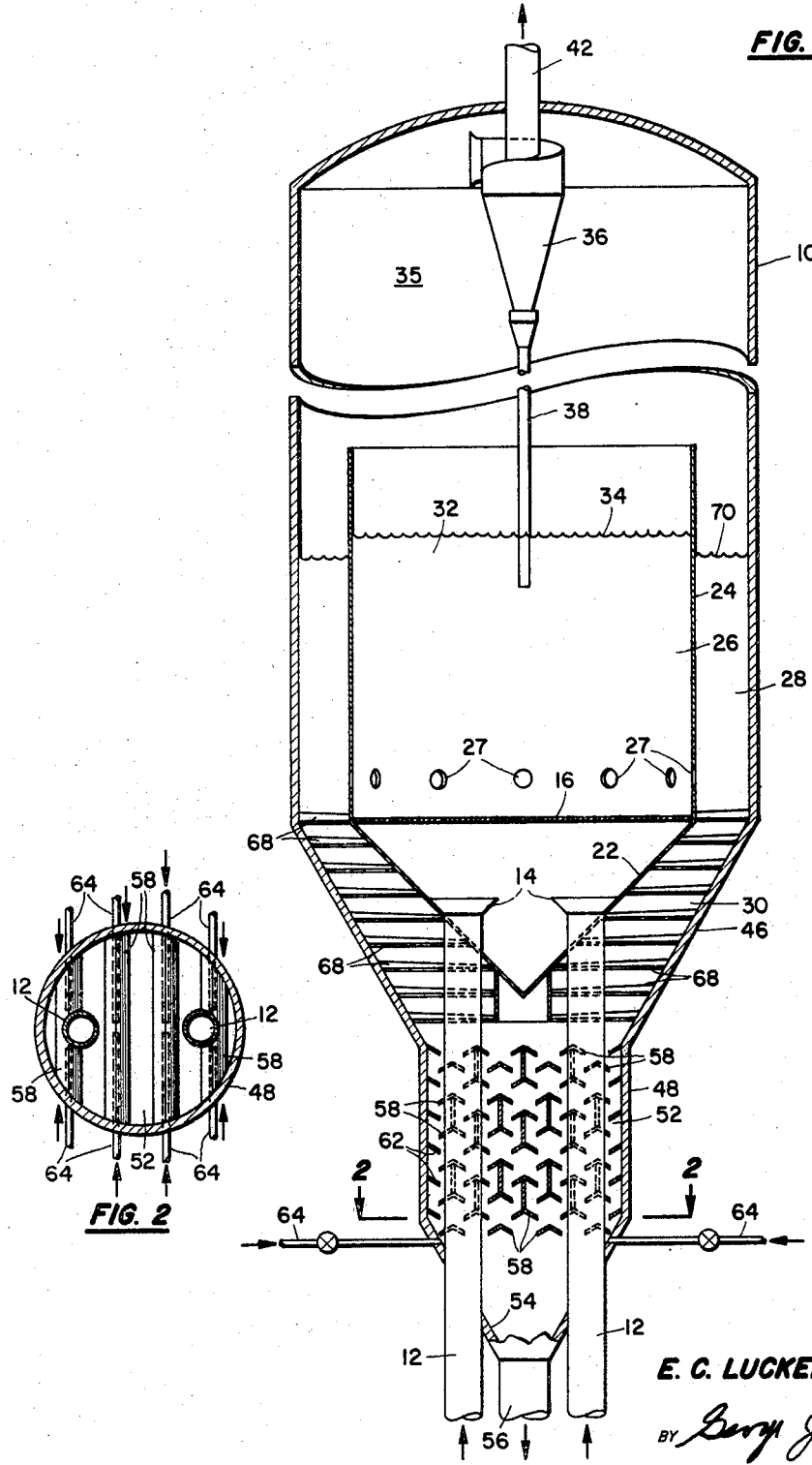

This invention relates to a reactor vessel suitable for use in a catalytic conversion operations and more particularly relates to apparatus for stripping volatile material from finely divided solids. The invention has particular application to stripping volatile hydrocarbons from adsorbent catalyst or contact particles but is also useful in stripping oxygen from regenerated catalyst particles.

In fluid catalytic cracking plants the fouled or spent catalyst or contact particles are withdrawn as a dense fluidized phase from the bottom portion of the reactor and are subjected to steam stripping to remove valuable hydrocarbons from the catalyst or contact particles before these particles are introduced into the regeneration zone. With poor stripping, these hydrocarbons left adsorbed on the catalyst or contact particles are burned in the regenerator and lost. It is also desirable to have the regenerator provided with a stripping zone or chamber to remove oxygen adsorbed on the regenerated catalyst or contact particles to prevent oxygen or to decrease the amount of oxygen being carried back to the reactor where fresh hydrocarbon feed is burned up by the oxygen carried over to the reactor by the regenerated particles.

Various baffled annular stripping zones or sections including cells have been used but there is room for improvement especially in the fluid catalytic cracking units which have a cone-shaped inlet member below the distribution grid and the space between the cone-shaped member and the reactor has not been utilized because of its unusual shape.

According to the present invention an improved stripping apparatus is disclosed in which the tapered zone between the inverted conical bottom portion of the feed cone which is V-shaped in vertical cross section and the tapered or funnel-shaped lower wall of the reactor is provided with a plurality of rows of radial sheds arranged one above the other to compensate for changes in the geometric proportions or formation of the stripping section. The radial sheds in each row are provided at their lower vertical sides or bottom edges with serrations or notches arranged in a predetermined manner to force the stripping gas outward from the center of the stripping zone so that each square foot of horizontal stripper cross sectional area is subjected to stripping with a substantially equal quantity of stripping gas. The tops or roofs of the sheds are sloped down at an angle to the horizontal from the outer reactor wall toward the inner cone member or center of the reactor. The stripping is in dense phase and the gas flows up countercurrently to the downflowing dense phase catalyst.

The provision of rows of notched radially arranged sheds in a fluid solids unit stripping zone results in improved distribution and redistribution of gaseous stripping material in the stripping zone so that substantially constant velocities of the upflowing gaseous material are maintained in the stripping zone regardless of the size or shape of the stripping zone cross sectional area or in changing-shape stripping zones. Shorter stripping zones or sections can be used and wasted space in reactor vessels can be utilized. Also the downflowing fluidized catalyst particles are redistributed to obtain improved stripping.

Addition of notches or serrations to the bottom edges or vertical skirt portions of the sheds in the catalytic cracking unit stripping section and selected spacing of the notches or serrations effect distribution and/or redistribution of stripping gas in the stripping section so that substantially equal distribution of the upflowing stripping gas can be maintained in the stripping section horizontal cross-sectional area regardless of the shape of the horizontal or vertical stripping section cross sectional area. The notches or serrations are spaced selectively to force the stripping gas outwardly from the center of the reactor vessel so that each horizontal square foot of stripper cross sectional area is subjected to stripping with an equal quantity of stripping gas.

These notched or serrated sheds permit utilizing the area in a catalytic cracking unit around the feed conical member part of which is beneath the reactor distribution grid for stripping and greatly reducing the amount of strippable hydrocarbons on the catalyst particles.

The present invention is also useful in substantially straight sided annular strippers or stripping zones especially where the annulus of the stripper is very wide. If the sheds are not provided with serrations at the bottom edges of the sheds in a predetermined spacing arrangement, an inch of the bottom edge of the stripper would be associated with stripping a large square inch area of the stripper near the outside wall and a much smaller area near the inside wall of the stripper. Sheds alone would be completely inadequate to distribute catalyst and stripping gas in a stripping zone having a wide annulus in a straight sided annulur stripper and also in a stripping zone of the conical shape shown in the drawing in the present case. Investment savings are realized as the reaction vessel elevation can be reduced with the more effective stripper sheds, since the straight side stripping section can be shortened.

Figure 3:
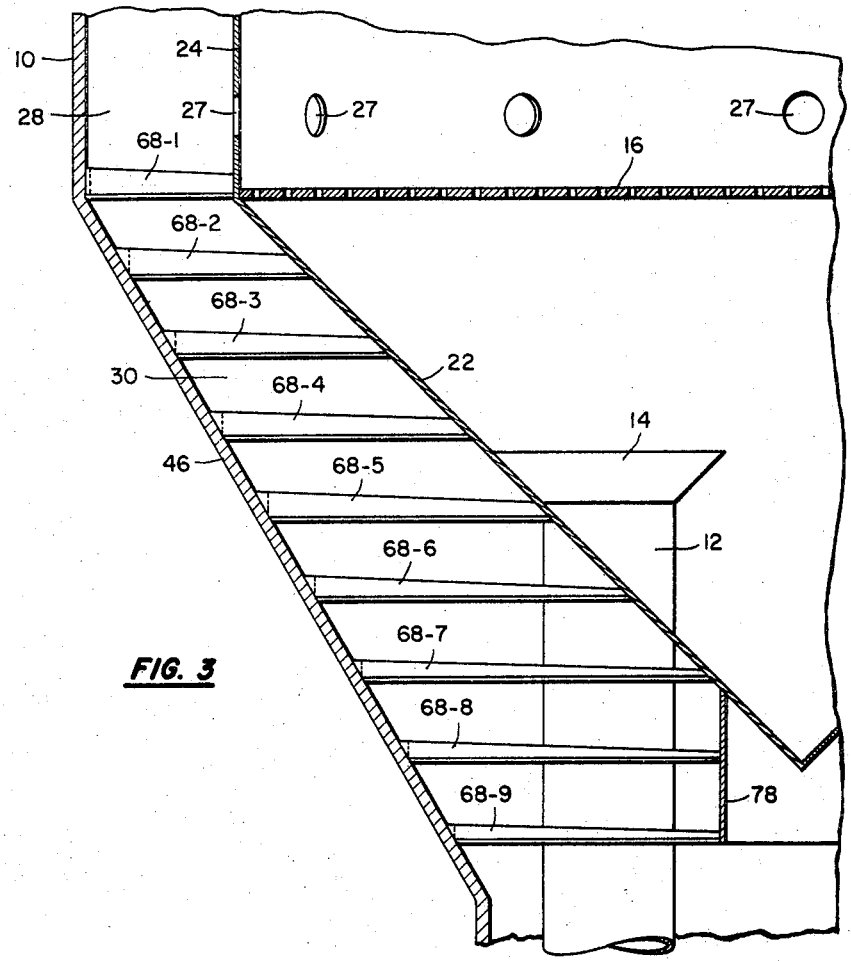
Figure 4:
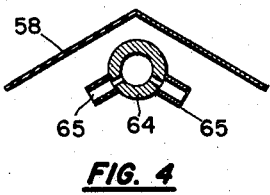
Figure 6:
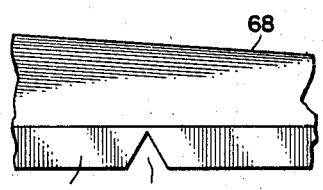
Figure 5:
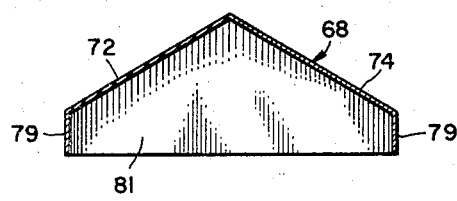

In the drawings:
FIG. 1 represents a vertical section through a reactor provided with a stripping section having a tapered portion intermediate its ends and including diagrammatically shown sheds;
FIG. 2 represents a horizontal cross section taken near the bottom of the well stripper substantially along line 2—2 of FIG. 1;
FIG. 3 represents an enlarged vertical section taken through one side of the tapered stripping section showing the spaced rows of sheds;
FIGS. 4, 5, and 6 are representations of details of a typical stripping shed and related equipment for the bottom well stripping section and the tapered stripping section;
FIGS. 7, 8, and 9 are diagrammatic views of quadrants at different levels of the tapered stripping section showing how the vertical rows of sheds are arranged and how they diminish in diameter in going from top to bottom; and
FIGS. 10 to 18 show how the serrations or notches are arranged on the sheds at the different levels in the rows to insure correct distribution of upflowing stripping gas and downflowing fluidized catalyst particles in the stripping section.

Referring now to the drawing and particularly to FIG. 1, the reference character 10 designates a reactor vessel adapted for contacting gaseous fluids and finely divided solid particles. Two vertical inlet pipes or risers 12 are provided which extend down through the bottom of the reactor 10 and have flared open upper ends 14 arranged within the reactor below horizontally arranged perforated distribution or grid plate 16 for introducing into the reactor and for distributing gaseous fluids and contact particles across the area of the reactor vessel 10. One or more risers 12 may be used. The distribution plate is circular in form, is concentric with the reactor 10 and is of a smaller diameter than vessel 10.

The reactor is especially adapted for the catalytic cracking of hydrocarbons such as gas oils or heavier hydrocarbon oil fractions for the production of motor fuels such as gasoline.

The temperature during cracking is between about 850° F. and 1000° F. The catalyst is any conventional cracking catalyst such as silica-alumina having 13 to 30% of alumina. Other catalysts such as the zeolitic cracking catalysts may be used. The catalyst is of a size between about 0 and 100 microns with the majority of the particles being between about 20 and 80 microns.

The grid member 16 is located inside and near the upper end of inverted conical member 22 which is connected at its upper end to vertically arranged sleeve or cylindrical member 24 which extends upwardly and forms inner reaction chamber 26 and is spaced from the inner wall of the reactor 10 and concentric with the vertical axis of the reactor 10. The sleeve member 24 is provided with a plurality of holes 27 near its lower end for providing communication between the interior of chamber 26 and the annular space 28 between sleeve member 24 and the wall of reactor 10. The holes 27 are arranged in a circle and are in the same horizontal plane. Spent catalyst particles pass from the chamber 26 through openings 27 into the annular stripping zone 28. The annular space 28 forms the upper portion or extension of an annular lower tapered stripping section 30 to be described hereinafter.

In the catalytic cracking of hydrocarbons, hydrocarbons and finely divided cracking catalysts at cracking temperature are passed up through risers 12 and the catalyst particles and hydrocarbons vapors pass through grid 16 into chamber 26. The superficial velocity of the vaporous material passing up through chamber 26 is between about 0.5 and 5.0 ft. per second to produce a dense turbulent fluid bed 32 having a level indicated at 34.

Above the level 34 is a dilute phase 35 of cracked or converted vapors and entrained catalyst particles. The cracked vapors are passed upwardly in reactor 10 and through cyclone separator system or the like 36 for separating entrained catalyst particles from cracked vapors. More than one cyclone separator is preferably used.

The separated catalyst particles are returned to the dense bed 32 through cyclone separator dipleg 38. They may be returned to the top of the annular stripping zone 28 to minimize the recontacting of spent catalyst in the reaction zone. The recovered vaporous cracked hydrocarbons are passed overhead through line 42 and treated to recover desired products such as gasoline.

During cracking coke is laid down on the catalyst particles and they must be regenerated by burning off the coke in a regenerator. However, before being passed to the regenerator (not shown), it is necessary to strip the catalyst particles with steam and this is done in a stripping zone or section where the catalyst particles in a dense fluidized condition pass down countercurrent to upflowing steam to remove entrained and adsorbed hydrocarbons. The stripped-out hydrocarbons and steam pass up through the stripping section into the dilute phase 35 for withdrawal from the reactor with cracked vapors.

The lower portion of reactor 10 has a wall which extends inwardly at 46 and is formed as a frustum of an inverted cone and connects the upper cylindrical or main portion of reactor 10 with a bottom cylindrical portion 48 of a smaller diameter to provide a bottom stripping section or stripping well 52. The main stripping section 30 is formed between sloping cylindrical wall 46 of the reactor 10 and the inverted conical member 22 to form a tapered zone. The wall of the inverted conical member 22 forms a greater angle with the vertical than sloping wall 46 so that the resulting space 30 between these walls forms the main stripping section or zone 30 as a tapered zone, that is, the wall of the conical member 22 and wall 46 of the reactor 10 are not parallel and a stripping zone of unusual shape results.

The wall of the conical member 22 and wall 46 may be parallel, although this is not the case in the usual fluid solids reactor nor the case in the present embodiment. Arranged in the main tapered stripping zone 30 are rows of sheds 68 which are diagrammatically shown at 68 in FIG. 1 but which are shown in greater detail in other figures in the drawing and will be described in greater detail hereinafter.

The bottom of the reactor 10 has an inwardly directed wall 54 which is formed as a frustum of an inverted cone or as a funnel and terminates in the bottom of the reactor as an outlet line 56 for removing stripped spent catalyst particles from the reactor 10 which are then passed to a regenerator (not shown). The bottom stripping well 52 is provided with rows of inner sheds 58 and rows of wall or side sheds or baffles 62 and a plurality of steam inlet lines 64 for introducing stripping gas into the bottom portion of the stripping well 52, preferably below the bottom or lower sheds. The side sheds 62 are attached to the inner wall of cylindrical portion 48 and are on opposite sides of the stripping well 52. The sheds 62 are subtended by an arc of a cricle. If desired, the bottom stripping well may be omitted depending upon the amount of stripping that is required.

The arrangement of the sheds 58 and wall baffles 62 in the stripping well 52 will now be described in greater detail. The sheds 58 are elongated members having an inverted V-shape in vertical cross section with the walls being at an angle of about 30° with the horizontal. The sheds 58 are attached to the inner wall of the well stripper 52 in any suitable manner. The sheds 58 in the bottom well stripper are arranged as chords of a circle in parallel relation as shown in FIGS. 2 and 9. Steam or stripping gas pipes are arranged below the sheds 58 only in the lower part of the well stripping zone 52 to introduce stripping gas for passage up through stripping zones 52, 30 and 28. The steam pipes diagrammatically shown at 64 in FIG. 1 are similar to that shown in greater detail in FIG. 4 and include a plurality of nozzles 65 arranged along the pipe for introducing steam along the length of the sheds 58. The wall sheds 62 are also arranged at an angle of 30° to the horizontal.

Each row of sheds 58 is displaced or offset one space from the row of sheds beneath it so that the stripping gas rising between two sheds in one row will be caught by a shed directly above the open space and be redistributed at that level. The sheds in bottom well stripper 52 are slightly different from those in tapered stripping zone 30 in that they are of inverted V-shape only without notched sides. Wall sheds or baffles are provided at 62 which are in effect one-half of a shed.

The three bottom rows of sheds are provided with steam or stripping gas pipes provided with nozzles. The pipes extend along the length of and underneath the sheds 58 and 62. There are vertical partitions in the stripper zone 52 between every other shed row to minimize the hydraulic radius of this portion of the stripping section. Other arrangements of baffles may be used.

In the cracking step hydrocarbon vapors and finely divided catalyst particles are passed to the inner cylindrical chamber 26 and the velocity of the upflowing gas or vapor is selected to form the dense turbulent fluid 32 having the level indicated at 34. Surrounding the chamber 26 is annular stripping space 28 into which catalyst particles flow from the lower or bottom portion of the dense fluid bed 32 through the plurality of openings 27 provided in the lower portion of the sleeve 24 which forms the inner cylindrical chamber 26. There is a pressure drop due to the flow of the dense fluidized mixture as it passes through openings 27 into space 28. Thus, the level of the fluidized catalyst particles in space 28 is indicated at a lower level 70 than level 34 in chamber 26.

The annular space 28 functions as the upper portion of the main stripping tapered section 30 as stripping gas and stripped-out material from stripping zone 30 passes up through upper annular top stripping zone 28 and then into the dilute phase 35 above dense fluidized phase 32 and into the cyclone separator system 36 to remove entrained solids from cracked vapors. The dense fluidized catalyst particles flow down through top stripping zone 28, then tapered stripping zone 30 and then bottom well stripper 52 countercurrent to the upflowing stripping gas during the stripping operation.

Stripping gas is introduced through lines 64 at the bottom portion of bottom stripping well 52 and it passes up countercurrent to the downflowing dense fluidized catalyst solids passing down from the tapered stripping zone 30. This stripping gas and stripped-out material passes up through bottom well stripper 52, main tapered stripping zone 30 and top annular stripping zone 28.

From the bottom of bottom stripper well 52 through outlet line 56 of reactor 10 the stripped spent catalyst particles are passed to a regenerator (not shown) for regenerating the spent catalyst particles to remove coke or carbonaceous deposits formed during the cracking step in the reactor 10. The coke is removed by burning with air and this also heats the catalyst particles to a temperature above the cracking temperature to supply heat of cracking or conversion of the oil feed in the reactor 10. The temperature during regeneration may be between about 950° F. and 1250° F. The regenerated catalyst particles are returned to the reactor through risers 12.

The regenerator may be provided with a stripping zone or section similar to that described in connection with the reactor 10 where a plurality of sheds 68 are used to get staged stripping of regeneration gases from the catalyst flowing to the reactor and equal distribution of the stripping gas throughout this stripping zone.

Referring now to FIG. 3, there is shown an enlarged vertical cross section of one side of the tapered stripping zone 30 to show the spaced vertical arrangement of the sheds. In this specific form of apparatus there are 9 radial rows of sheds 68 indicated as 68–1 to 68–9 and which are substantially vertically spaced equally in the stripping zone 30. This particular arrangement is for one particular form of reactor, and other similar arrangements may be made to conform to reactors of different shapes. According to the present invention, the sizes of the sheds are selected and particular arrangements of notched or serrated sides on the sheds are used to effect proper distribution of the stripping gas and the catalyst being stripped. The sheds in each radial row are of the same size but the sheds in different rows differ. In the preferred embodiment for this shape reactor, there are 23 sheds in each row. The sheds in each row are separated by a space of substantially the same size and shape as the shed in that row. The rows of sheds are spaced about two feet and six inches apart from top to bottom in the zone 30. Each row of sheds is horizontally displaced one space from the row of sheds beneath it, so that stripping gas rising between two sheds in one row will be caught by a shed directly above the open space and be redistributed at that level.

In this specific form the reactor 10 is about 45 feet in diameter and 45 feet in height from the juncture of the largest diameter of reactor 10 with downwardly tapering section 46 to the juncture of the top outer cylindrical wall with the top head of the reactor 10 and with the vertical distance from the top to the bottom of tapering section 30 being about 22 feet and the height of the bottom or well stripping section 52 to the outlet pipe 56 being about 25 feet. The reactor grid 16 is about 36 feet in diameter. The inner cylinder 24 has an inner diameter of about 36 feet and the annular space 28 has an inner diameter of about 36 feet and an outer diameter of about 45 feet.

FIG. 4 represents a vertical cross sectional view of a shed 58 provided with a steam or stripping gas pipe 64 with nozzle 65 each arranged at a 30° angle with the horizontal. The pipe or pipes 64 extend along the length of and underneath the sheds 58 in the well stripper 52 and contains a plurality of sets of nozzles 65 arranged along the pipe or pipes.

FIG. 5 represents a vertical cross section of a shed 68 of inverted V-shaped form having top slanting sides 72 and 74 like a roof with each side being at a 30° angle with the horizontal. The bottom edge portions 79 of the sides 72 and 74 are formed as relatively short vertical skirts or sides of about two inches high. The height of the sheds 68 varies in the different rows as will be pointed out hereinafter. These bottom skirts or sides 79 are notched or serrated as at 77 in FIG. 6 along the length of each shed. The notches or serrations are spaced at different distances apart in some sections of each shed and are not equally spaced along the length of each shed. The notches 77 in the bottom portions 79 of the sides are similar to saw teeth and have a depth of about two inches. The sides of the notches from the bottom to the apex are at an angle of 60° with the horizontal. All the notches of all the sheds are of equal size. In FIG. 5 there is shown a vapor stop 81 which is in effect a wall or baffle as will be later described.

FIGS. 7–9 show the arrangements of the sheds in the different rows 68–1 to 68–9. The sheds in each row are spaced apart a distance about equal to the dimension of the shed in that row. In row 68–1 the sheds are spaced as at 80 and the dimension of the space is about the same as that of the shed in this row. As the sheds are on radiuses, it is noted that the outer circumference or periphery is larger than the inner circumference or periphery.

As the outer circumference is larger than the inner circumference adjacent conical member 22, the horizontal cross section at the outer circumference is greater than at the inner circumference, and more catalyst will flow down near the outer circumference. Hence, more notches 77 are provided adjacent sloping wall 46 to force more stripping gas out of the sheds in this region.

The next lower row of sheds 68–2 are smaller and so on down to row 68–9. As pointed out above, each row of sheds is disaligned with the adjoining rows so that the spaces between the sheds of one row are below and above a shed in an adjoining row except the top and bottom rows.

With this arrangement of sheds, the downflowing catalyst is separated into two streams as it hits the roof of the shed below a space, and this action is multiplied many times as the catalyst flows down through spaces between sheds at one level and hits the roof of sheds at the next lower level etc. so that extremely good mixing of the catalyst and stripping gas is obtained. The stripping gas as it passes up through a space or spaces between sheds at one level will be caught beneath a shed or sheds at the next level and subdivided into two streams by each shed as the stripping gas flows out from under the shed or sheds and from the serrations or notches on the bottom edges thereof.

As shown in FIGS. 10 to 18, the sheds have a sloping top surface which slopes from left to right in these figures or from the outer wall of the reactor 10 toward the inverted cone-shaped member 22. The left end of each shed is bigger in height and wider than the corresponding closed end of the shed at the right end in these figures and the sides of each shed slope in or taper in from the larger end to the smaller end so that the vertical cross sectional area of the left-hand or outer wall end of each shed in each row is larger than the vertical cross sectional area at the right-hand or inner end of the shed in the corresponding row. Also, the volume of each shed decreases from left to right in FIGS. 10 to 18. On the other half of the stripping zone (not shown) the reverse is true. In this embodiment this change in volume is provided so that vapors can flow freely toward the left without appreciably increasing in velocity.

In this specific embodiment, for example, the top radial shed row 68–1 has 23 sheds arranged in an annulus, each shed is laterally spaced from an adjacent shed by a space 80, which is of about the same shape and dimension as the shed in row 68–1. See FIG. 7 where the outer or circumferential dimension of the shed 68–1 and the outer dimension of space 80 are the same (37 inches) and the inner dimensions of shed 68–1 and space 80 are the same (29.1 inches). This is true of all the radial rows of sheds, that is, the sheds are separated in each respective row a distance about equal to the width and shape of the shed in that row.

Each shed has a vapor stop or a closed end at one or the other end. A vapor stop 81 is shown in FIG. 5. A closed end 84 (FIG. 10) is an end which is welded directly to the shell of the vessel or the wall of the cone, or is provided with a welded cover as at 84 in shed 68–1. Since allowance for thermal expansion of the shed must be provided, a sliding fit arrangement is provided on the end of the shed not welded. A vapor stop must be provided at this sliding fit end to prevent stripping gases or vapors from bypassing the serrations and escaping up the apex of the sliding joint.

In FIG. 3 it is apparent that the wall of the inverted cone-shaped member 22 is not parallel to the wall 46 of the reactor 10 and that gives the stripping section 30 a tapered form. Previous reactor designs did not use this space because of its shape. With the present invention additional stripping space is provided and, in addition, the overall height of the reactor can be reduced as the straight sided stripping section 48, that must be provided on the bottom of the vessel 10, can be reduced or shortened.

It will be seen from FIG. 3 that the width of the annulus between outer wall 46 and inverted cone member 22 increases from top to bottom and that the sheds in rows 68–1 to 68–7 increase in length (from wall 46 to cone 22) due to the construction of tapered stripping zone 30. Because of the construction of the lower part of stripping zone 30 and vertical annular member or wall 78 extending from the outer surface of inverted cone member 22 to the bottom radial row 68–9 of sheds, the sheds in rows 68–8 and 68–9 decrease in length.

Wall 78 is provided to minimize the length of the lower sheds in the tapered zone 30 without losing a significant cross sectional area of the stripping zone. Also, if this wall were not provided, the width of the tapered sheds would decrease to an extent where there would be insufficient metal to properly support the end of the shed. For example, in FIGS. 8 and 17, the inner end of the 8th row of sheds is about 4.5 inches wide. If the wall were not provided, these sheds would terminate in points at the centerline of the vessel.

It will also be seen that the vertical cross sectional area of the sheds in the first seven rows (68–1 to 68–7) decreases from top to bottom row. The sheds in rows 68–8 and 68–9 have smaller vertical cross sectional areas at the left than the sheds in rows 68–1 to 68–7 but the vertical cross sectional areas of the sheds in rows 68–8 to 68–9 at the extreme right or inner end near wall 78 are substantially the same since they are attached to cylindrical wall 78 which has a constant diameter.

Stripping gas introduced into the lower portion of the bottom stripping well 52 through pipes 64 and nozzles 65 passes up through the well and contacts downwardly flowing dense phase fluidized catalyst particles which have been stripped in passing through stripping zones 28 and 30. The stripping gas plus stripped-out material pass up from well stripper 52.

As the stripping gas passes upwardly from the stripping well 52, it passes into the lower larger end of the main tapered stripping zone 30 where it first contacts the downflowing catalyst and the lowest row of sheds 68–9. Each shed 68–9 in the bottom row at its inner or right end in the drawing abuts vertical wall 78 and not the cone member 22. This is also true of the next higher row of sheds 68–8.

As there is a tendency for the stripping gas to go up straight and follow the vertical wall 78 and inverted conical member 22 rather than go to the outwardly sloping wall 46 of the reactor, the notches 77 in the sheds at the inner end near wall 78 and conical member 22 are spaced relatively far apart to cause the stripping gas to flow horizontally underneath and in the sheds toward the left in FIGS. 3 and 10 to 18 where the notches are closer together to obtain better distribution of the stripping gas.

The arrangement of the sheds 68 and the predetermined arrangement of notches 77 closer together at the left-hand side in FIGS. 3 and 10 to 18 also has the advantage of redistributing the downflowing dense phase catalyst. As the catalyst flows down from annular stripping zone 28 (FIG. 3), there is a tendency for the catalyst to flow straight down toward and along sloping wall 46. Because there are more notches 77 in the sheds 68 at the left-hand side of FIG. 3, for example, the catalyst will be contacted with more steam or gas and aerated and caused to flow to the right in FIG. 3, and hence a better distribution of the downflowing catalyst and better stripping are obtained.

The specific embodiment showing the arrangement of the rows of sheds in FIGS. 3 and 10 to 18 will now be specifically described. For example, in bottom row 68–9 in FIG. 18, each shed 68 is provided with vertical skirts or bottom edges 79 having notches 77 therein and there are 18 notches in each shed side, and the first notch 77 is about 9.5″ from the inner end wall 78 to provide a vertical skirt or wall to prevent stripping gas bypassing the shed at wall 78. The end of the shed 68–9 is welded to inner end wall 78 in a tight fit, and the other end of the shed adjacent sloping wall 46 has a vapor stop 81 as above described. There is a non-notched or solid bottom side portion 90 ahead of the first notch 77 in the shed which is about 9″ long and this distributes the upflowing stripping gas and prevents too much stripping gas from by-passing the bottom shed and passing up along inner end wall member 78 and conical member 22.

The first two notches near vertical wall 78 are spaced 9.5″ apart, then counting from the right in FIG. 18 the second and third notches are 8″ apart, the third through the sixth notches are 6″ apart, the sixth through the eighth are 5″ apart, the eighth through the tenth are 4.5″ apart, the tenth through the thirteenth are 4″ apart, the thirteenth through the seventeenth are 3.5″ apart, and the seventeenth and eighteenth near sloping wall 46 are 3″ apart.

The bottom side wall of the shed 68–9 near wall 46 is not notched so that between the last notch, the eighteenth, and the wall 46, there is a solid bottom side wall 69 to prevent stripping gas from by-passing the bottom shed in row 68–9 near the sloping wall 46. The solid portion 69 without notches is about 7″ long.

With this arrangement of sheds, some stripping gas flows from the notches 77 near the inner end wall 78 and up countercurrent to the downflowing fluidized catalyst particles, but more stripping gas is forced to the left in FIG. 18 for greater flow from more notches 77 near wall 46 for upward flow countercurrent to the downflowing fluidized catalyst particles. With this arrangement a better distribution of the stripping gas and catalyst are obtained and improved stripping of the catalyst particles is obtained.

A similar but not the same arrangement is made in the other rows of sheds (68–8 to 68–1).

Each shed 68 in bottom row 68–9 is about 98″ long. At its left-hand end near wall 46, each shed in row 68–9 is 5″ high and about 18″ wide. At its other end near inner end wall 78, each shed in row 68–9 is about 3.3″ high and about 4.5″ wide.

From these dimensions it will be seen that each shed 68 in row 68–9 has larger dimensions at the left end near wall 46 than at the right end near wall 78 or conical member 22 and hence the top or roof of each shed slopes from right to left in FIGS. 10–18.

In the next higher row 68–8 of sheds 68 in FIG. 17, there is a non-notched side portion 90 in each shed as in row 68–9 and the notches 77 in each shed are spaced as follows; the first two notches near vertical wall 78 are 12″ apart, the second and third notches are 10″ apart, the third and fourth notches are 9″ apart, the fourth and fifth are 8″ apart, the fifth and sixth are 7″ apart, the sixth and seventh are 6″ apart, the seventh and eighth are 5″ apart, the eighth, ninth and tenth are 4.5″ apart, the tenth through fourteenth are 4″ apart, the fourteenth through the eighteenth are 3.5″ apart and the eighteenth through the twentieth near sloping wall 46 are 3″ apart. Here again, the ends of the sheds near the sloping wall 46 have a non-notched side portion 69. The non-notched bottom side or skirt portions 69 and 90 are provided on all the sheds in rows 68–1 to 68–9 and in some cases are of different sizes.

Each shed 68 in row 68–8 is about 116″ long. At its left-hand end in FIG. 17, the shed in row 68–8 is 7.7″ high and 20.4″ wide and at its right-hand end in FIG. 17 adjacent inner vertical wall 78 the shed 68–8 is about 3.3″ high and 4.5″ wide.

In the next higher row 68–7 in FIG. 16, there are 22 notches 77 on each side skirt of each shed 68. The sheds in row 68–7 are each about 128″ long. The left-hand end of each shed 68 adjacent sloping wall 46 is 8.4″ high and 22.8″ wide. At the opposite end each shed is 3.3″ high and 4.5″ wide. The first notch 77 is shed 68–7 starting at the right at inverted conical member 22 is 14″ from the second notch, going to the left, the third notch is 12″ away from the second, the fourth notch is 9″ from the third, the fifth 8″ from the fourth, the sixth 7″ from the fifth, the seventh 6″ from the sixth, the seventh through the tenth 5″ apart, the eleventh is 4.5″ from the tenth, the eleventh through the fifteenth are 4″ apart, the fifteenth through the twentieth are 3.5″ apart, and the twentieth through the twenty-second are 3″ apart.

At the left-hand end adjacent sloping wall 46, each bottom side of each shed 68 in each row 68–1 to 68–9 is provided with a non-notched or imperforate skirt portion 69 to prevent stripping gas from by-passing the end of each shed adjacent sloping wall 46.

In the next higher row 68–6 in FIG. 15, there are 22 notches 77 in each side wall or skirt of each shed 68. Each shed 68 in this row is about 117.5″ long, about 9.1″ high and 25.2″ wide at the left-hand end in FIG. 15 near sloping wall 46, and about 4.5″ high and 8.6″ wide at the right-hand end in FIG. 15. The first notch near conical member 22 is 9″ from the second, the second 9″ from the third, the third 8″ from the fourth, the fourth 7″ from the fifth, the fifth 6″ from the sixth, the sixth 6″ from the seventh, the seventh 5″ from the eighth, the eighth 5″ from the ninth, the ninth 4.5″ from the tenth, the tenth 4.5″ from the eleventh, the eleventh 4″ from the twelfth, the eleventh through the fifteenth each 4″ apart, the fifteenth from the sixteenth 3.5″, the fifteenth through the nineteenth each 3.5″ apart, the nineteenth 3″ from the twentieth, and the nineteenth through the twenty-second 3″ apart.

Each shed in the next higher row 68–5 (FIG. 14) has 21 notches in each hsed vertical skirt. Each shed 68 is about 105″ long. At the left-hand end near sloping wall 46, each shed in row 68–5 is about 7.8″ high and 27.5″ wide. At the opposite end near conical member 22, each shed is 5.7″ high and 12.7″ wide. In each shed in this row the first notch, starting near conical member 22, is 8″ from the second, the next notch is 7″ from the second, the third is 6″ from the fourth, the fourth 6″ from the fifth, the fifth 5″ from the sixth, the sixth 5″ from the seventh, the seventh 4.5″ from the eighth, the seventh through the tenth 4.5″ apart, the tenth 4″ from the eleventh, the tenth through the fourteenth 4″ apart, the fourteenth 3.5″ from the fifteenth, the fourteenth through the eighteenth 3.5″ apart, the eighteenth 3″ from the nineteenth and the eighteenth through the twenty-first 3″ apart.

Each shed in the next higher row 68–4 of sheds (FIG. 13) has 19 notches in each vertical bottom skirt or side. Each shed 68 in row 68–4 is about 92″ long and at its left end near sloping wall 46 is about 10.5″ high and about 30.0″ wide. At its opposite end near conical member 22 each shed is about 6.9″ high and 16.8″ wide.

Starting near conical member 22, the first two notches in the shed are 7″ apart, the second is 6″ from the third, the third 5″ from the fourth, the fourth 4.5″ from the fifth, the fifth 4.5″ from the sixth, the sixth 4.5″ from the seventh, the seventh 4″ from the eighth, the seventh through the tenth 4″ apart, the tenth 3.5″ from the eleventh, the tenth through the sixteenth 3.5″ apart, the sixteenth 3″ from the seventeenth, and the sixteenth through the nineteenth 3″ apart.

Each shed in the next higher row 68–3 of sheds 68 (FIG. 12) has 18 notches in each vertical bottom skirt or side. Each shed 68 in row 68–3 is about 79.5″ long and at its larger end near sloping wall 46 it is about 11.1″ high and about 32.4″ wide. At its smaller end near conical member 22, each shed in this row is about 8″ high and about 20.9″ wide.

Starting near conical member 22 at the right in FIG. 12, the first notch in each shed is spaced from member 22 by imperforate bottom side or skirt portion 90 and the first five nothces are spaced 4.5″ apart, the fifth is 4″ from the sixth, the fifth through the eighth 4.0″ apart, the eighth 3.5″ from the ninth, the eighth through the thirteenth 3.5″ apart, the thirteenth 3″ from the fourteenth, and the thirteenth through the eighteenth 3″ apart.

Each shed in the next higher row 68–2 of sheds 68 (FIG. 11) has 16 notches in each vertical bottom skirt or side. Each shed 68 in row 68–2 is about 66.7″ long. At its larger end near sloping wall 46, it is about 11.8″ high and 34.7″ wide. At its smaller end near conical member 22, each shed is about 9.2″ high and 25″ wide.

Starting near conical member 22 at the right in FIG. 11, the first notch in each shed 68 is 4.5″ from the second, the second 4″ from the third, the second through the fifth 4″ apart, the fifth 3.5″ from the sixth, the fifth through the eleventh 3.5″ apart, the eleventh 3.0″ from the twelfth, and the eleventh through the sixteenth 3″ apart. The first notch 77 near conical member 22 in each shed is spaced from the end of the shed by the non-notched or imperforate bottom side portion 90 in row 68–2 to cause or force stripping gas to move toward the left in FIG. 11 and to be distributed by the notches or serrations 77 and to move the downflowing fluidized catalyst particles toward the right and toward conical member 22 to obtain a more uniform downflowing distribution of the catalyst and the upflowing stripping gas. The bottom side portion in FIG. 11 is similar to the bottom side portions 90 in FIGS. 10 to 18.

The top row 68–1 of sheds 68 is shown in FIG. 10 and in this specific embodiment, this top row of sheds 68 is arranged near the upper end of conical member 22 and the lower portion of the vertical cylindrical wall of reactor 10. Each shed in row 68–1 has 14 notches in each vertical skirt or bottom side portion. Each shed 68 in top row 68–1 is about 54" long. At its larger end near reactor wall 10 at the left in FIG. 10, each shed is about 12.8" high and about 37.1" wide. At its other and smaller end adjacent conical member 22, each shed is about 10.4" high and about 29.1" wide.

Starting near conical member 22 at the right in FIG. 10, the first notch is 4" from the second, the second 4" from the third, the third 3.5" from the fourth, the third through the eighth 3.5" apart, the eighth 3" from the ninth and the eighth through the fourteenth 3" apart.

From the above it will be seen that in the specific embodiment here described the serrations or notches in the bottom rows of sheds are further apart at the inner end adjacent the inverted conical member 22 than serrations or notches in the sheds in the upper rows of sheds adjacent conical member 22.

The invention is not to be restricted to the numerical values described nor to the number of sheds or shed rows. A specific embodiment of one structure or apparatus is being given, but the invention is not to be limited thereto as the specific structures or apparatus may be varied without deviating from the main concept described which is to cause substantially equal distribution of the stripping gas as it passes up through a changing-shape stripping zone and also proper distribution of the downflowing catalyst being stripped.

The serrations or notches 77 redistribute and force the stripping gas outward toward wall 46 of the reactor 10 so that each square foot of the stripping zone horizontal cross sectional area is subjected to stripping with a substantially equal quantity of stripping gas.

The sheds in the rows 68–1 to 68–9 are provided with the notches 77 arranged at different intervals in the different rows to compensate for catalyst flow and gas flow according to the shape or geometry of the stripping zone.

In a commercial unit the diameter of the reactor 10 is about 45 feet and the diameter of cylinder 26 is about 36 feet. The vertical distance corresponding to the height of flaring wall 46 is about 22 feet which is about the height of main stripping zone 30. The height of well stripper 52 is about 20 feet and its diameter is about 19 feet. The amount of catalyst flowing down through the catalyst stripper is about 180 tons per minute and the amount of steam introduced through pipes 64 is about 3.5 pounds per 1000 pounds of catalyst.

Where the vertical walls of the stripping zone are parallel and spaced apart about 4 to 7 feet to form an annular stripping zone, it is advantageous to provide sheds like sheds 68 provided with notched bottom edges as at 77 to provide means for redistributing upflowing stripping gas and downflowing catalyst in the stripping zone. But here the sheds will be of substantially the same size in all the rows. Because of the relatively large width of the stripping zone, it is preferred to space the notches 77 in a way similar to that above described with the tapered stripping zone 30, that is, the notches are spaced further apart near the inner wall of the annular stripping zone and closer together near the outer wall of the annular stripping zone, that is, there are more notches 77 per linear inch in the shed bottom edges near the outer wall of the annular stripping zone than near the inner wall of the annular stripping zone.

What is claimed is:

1. A reactor adapted for use in catalytic conversions in which fluidized solids are used which includes an elongated cylindrical vessel having inlet means for gases and solids and outlet means for gase sand solids, a cylindrical inner chamber arranged in spaced relation from the inner wall of said vessel at an intermediate portion thereof, said inner chamber having an inverted cone-shaped bottom forming a tapered stripping chamber with the inner adjacent wall of said vessel, rows of sheds arranged one above another in said stripping chamber and so oriented that an open space between sheds of one row is directly beneath a shed of the row above it, said sheds in each row being spaced from one another and each shed having a roof with slanting sides provided with vertical bottom portions, each of said vertical portions being provided along their length with serrations, said serrations being arranged at non-uniform distances apart and being closer together at the end of said sheds adjacent said outer reactor wall.

2. A reactor adapted for contacting fluidized solids with gases which includes an elongated cylindrical vessel provided with an inlet and outlet for gases and solids and having a bottom stripping chamber of smaller horizontal cross section than said vessel and joined to said vessel by an outwardly flaring or expanding funnel-shaped wall section, a cylindrical inner chamber concentric with said vessel and spaced inwardly from the wall of said vessel at the lower portion thereof, said inner chamber being provided with an inverted cone-shaped bottom portion adjacent said funnel-shaped wall section but having a different angular relation to the vertical so that said funnel-shaped wall section and said cone-shaped bottom are not parallel but divergent to form a tapered stripping chamber, rows of sheds arranged one above the other in spaced relation in said stripping chamber so that a shed is located above the open space between sheds of the row beneath it, said sheds in each row being spaced from one another and each shed having an inverted V-shaped roof with vertical bottom portions extending therefrom, each of said vertical bottom portions being provided along its length with spaced serrations, said serrations being arranged closer together at the ends of the sheds adjacent said funnel-shaped wall section of said vessel whereby stripping gas passing up through said stripping chamber and dense phase catalyst passing down are redistributed so that the catalyst in each square foot of stripping chamber horizontal cross sectional area is subjected to stripping with a substantially equal quantity of stripping gas.

3. An apparatus according to claim 2 wherein said serrations in the sheds in the bottom rows are further apart at the inner end adjacent said inverted cone-shaped portion than serrations in the sheds in the upper rows of sheds.

References Cited

UNITED STATES PATENTS

| | | | |
|---|---|---|---|
| 2,415,755 | 2/1947 | Ogorzaly et al. | 23—288 |
| 2,628,158 | 2/1953 | Wilcox et al. | 23—288 |
| 2,917,373 | 12/1959 | Roquemore | 23—288 |
| 3,243,265 | 3/1966 | Annesser | 208—164 X |

JOSEPH SCOVRONEK, Primary Examiner

U.S. Cl. X.R.

208—150, 163; 261—109